Feb. 14, 1933. G. WOLF 1,897,974
INTERCHANGEABLE RUBBER TIRE
Filed Nov. 19, 1931
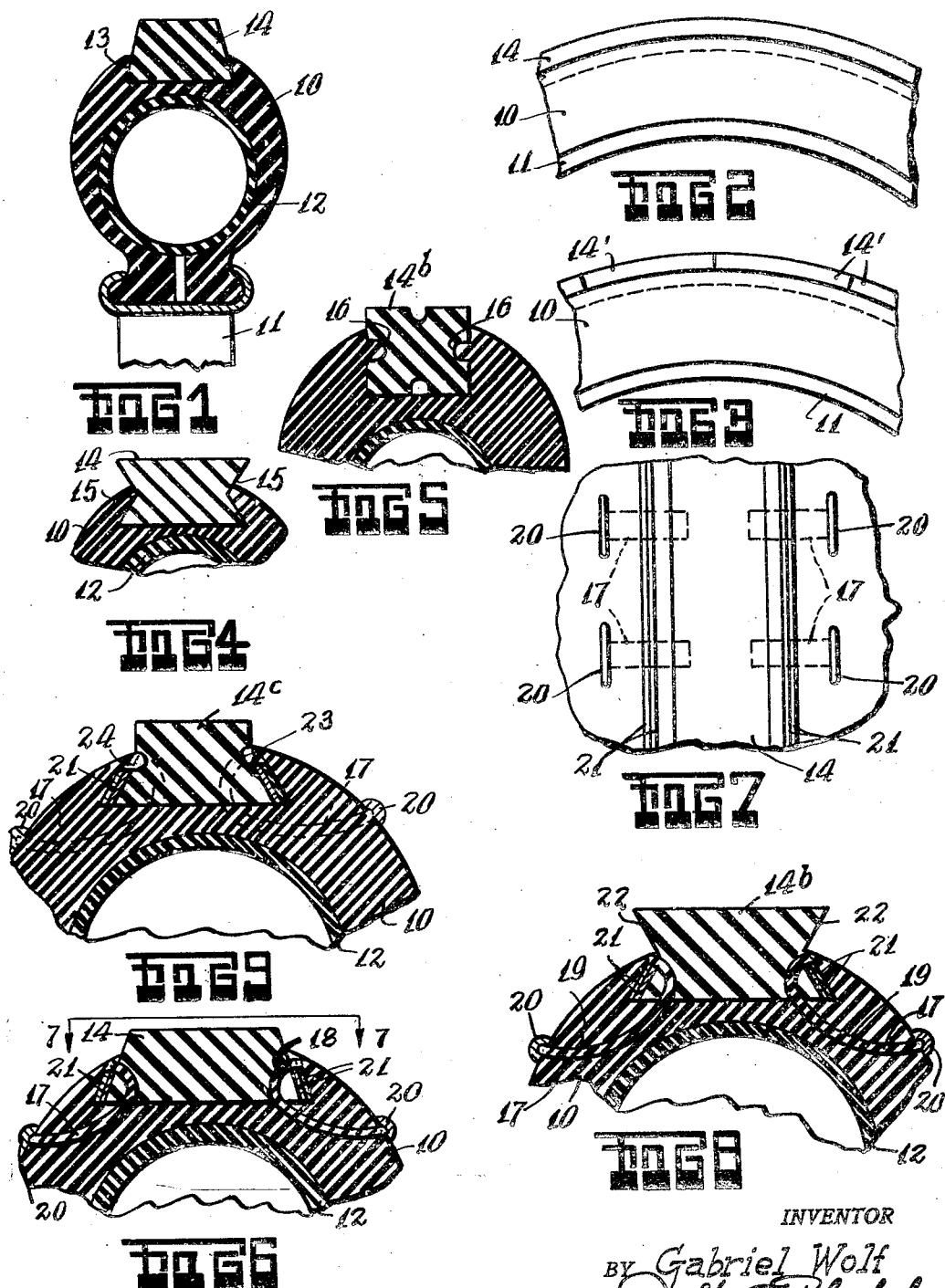
INVENTOR
BY Gabriel Wolf
ATTORNEY Patented Feb. 14, 1933

1,897,974

UNITED STATES PATENT OFFICE

GABRIEL WOLF, OF BRATISLAVA, CZECHOSLOVAKIA

INTERCHANGEABLE RUBBER TIRE

Application filed November 19, 1931. Serial No. 576,094.

This invention relates to new and useful improvements in vehicle tires.

The invention has for an object the construction of a vehicle tire which is characterized by a tread replaceable as it becomes worn.

A still further object of this invention is to construct the tread of one continuous piece or in the form of sections.

As another object of this invention it is proposed to construct a tread with inclined sides adapted to engage in a corresponding recess in the main portion of the tire for accomplishing the maintenance of the tread in place on the tire.

Furthermore, the invention proposes the construction of spaced straps along the main portion of the tire and engageable through the sides and out from the bottom of the inserted tread and terminating in the sides of the main portion of the tire where means is supplied for holding the straps in place. This construction is such as to absolutely insure the holding of the tread in place.

As a further object of this invention it is proposed to construct the tread of smaller size than the recess within the tire and to insert spacing strips to fill up the voids on the sides of the tread whereby the spacing strips may be removed or inserted for the purpose of adjusting the lateral position of the tread.

Another one of the objects of this invention is to construct a tread with sides of various shapes adapted particularly to better maintain its position.

A still further object of this invention is the construction of a tire of the class mentioned which is of simple, durable construction, dependable in use and efficient in action and which can be manufactured and sold at a reasonable cost.

For further comprehension of the invention, and of the objects and advantages thereof, reference will be had to the following description and accompanying drawing, and to the appended claims in which the various novel features of the invention are more particularly set forth.

In the accompanying drawing forming a material part of this disclosure:—

Fig. 1 is a transverse sectional view of a tire constructed according to this invention.

Fig. 2 is a fragmentary elevational view of Fig. 1.

Fig. 3 is a view similar to Fig. 2 but illustrating a modified arrangement.

Fig. 4 is a fragmentary view similar to a portion of Fig. 1 but illustrating another embodiment of the invention.

Fig. 5 is another view similar to Fig. 1 but illustrating a still further embodiment.

Fig. 6 is another view similar to a portion of Fig. 1 but illustrating another modification of the invention.

Fig. 7 is a fragmentary elevational view looking in the direction of the line 7—7 of Fig. 6.

Figs. 8 and 9 are views similar to Fig. 6 but illustrating different forms of the invention.

The automobile tire, according to this invention, comprises a shoe 10 held upon the rim 11 of a wheel and having an inner tube 12. The shoe 10 is formed with a dove-tailed recess 13 in which a tread member 14 is engaged. This tread member is of continuous form, that is in the shape of a ring and engaged in place under force so that it maintains its position. When the tread becomes worn it may be removed and a new tread inserted instead.

In Fig. 3 a modification of the invention has been disclosed in which a tread 14' is made from numerous sections. In other respects the invention is similar to the preferred form wherein corresponding reference numerals indicate the same parts.

In Fig. 4 another form of the tread 14 has been illustrated in which the sides comprise concave shapes 15. The object of these sides is to better insure the maintenance of the tread in place on the tire.

In Fig. 5 a still further modification has been shown in which a tread $14^b$ is illustrated in the form of a square in transverse cross section so that it may be inserted with any side as its outer side. To further insure the maintenance of the tread in place on the tire, ridges 16 project from the sides of the groove for accommodating the tread and engage in corresponding recesses in the sides of the tread.

In Fig. 6 a still further modification has been disclosed in which a means has been provided for positively holding the tread member 14 in place. This means is in the form of straps 17 connected with the main portion of the tire and regularly spaced from each other. These straps engage through openings 18 in the tread, which openings extend from the sides to the bottom. The straps then continue through passages 19 in the main portion of the tire and terminate at the sides of the tire. Anchorage members 20 are attached upon the free ends of the straps for the purpose of firmly holding the straps down. Spacer strips 21 are located on opposite sides of the tread 14 and within the recess in which the tread is mounted. These spacer strips preferably extend into the surface of the tire and have cutouts on their top edges to allow for the passage of the straps 17. The spacing strips 21 may be removed and an interchangement made, that is more or less placed on one side, for the purpose of shifting the lateral position of the tread. This is of exceptional value when the tread becomes worn as from use, particularly on one side.

In Fig. 8 a modification of the invention has been disclosed which is substantially identical to the form shown in Figs. 6 and 7, but differs in that the tread 14$^b$ has the top portions of its sides 22 diverging from the center while the bottom portion also diverges from the center. In other respects the construction is identical and similar parts may be recognized by corresponding reference numerals.

In Fig. 9 another modification has been disclosed in which a tread 14$^c$ has been illustrated which has a rectangular projecting portion. In addition, this tread has lateral recesses 23 engaging the projecting ridges 24 from the tire. The section illustrated in Fig. 9 is shown located between the straps 17 for the purpose of clearly indicating the projecting portions 24 and the ridges 23. In other respects this form is identical to the previous forms and will be recognized by similar reference numerals.

In use, when the tread becomes worn, it may be removed and its position changed or it may be replaced depending upon the modification which is used. In this manner, a great saving is effected in that it is not necessary to replace the tire entirely but just the tread portion.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is:—

1. A tire for the wheels of vehicles, comprising a shoe having a peripheral groove, a tread member engaging within said groove and projecting therefrom, straps connected with said shoe and passing through apertures extending from the sides of the tread member to the bottom and further passing through passages extending to the sides of the shoe, and means for securing the free ends of said straps.

2. A tire for the wheels of vehicles, comprising a shoe having a peripheral groove, a tread member engaging within said groove and projecting therefrom, straps connected with said shoe and passing through apertures extending from the sides of the tread member to the bottom and further passing through passages extending to the sides of the shoe, and means for securing the free ends of said straps, spacing strips being located on opposite sides of said tread member and within said groove for the purpose of allowing lateral adjustments of the tread.

3. A tire for the wheels of vehicles, comprising a shoe having a peripheral groove, a tread member engaging within said groove and projecting therefrom, straps connected with said shoe and passing through apertures extending from the sides of the tread member to the bottom and further passing through passages extending to the sides of the shoe, and means for securing the free ends of said straps, spacing strips being located on opposite sides of said tread member and within said groove for the purpose of allowing lateral adjustments of the tread, and ridges from the tire engaging in recesses in the sides of said tread member.

4. A tire for the wheels of vehicles, comprising a shoe having a peripheral groove, a tread member engaging within said groove and projecting therefrom, straps connected with said shoe and passing through apertures extending from the sides of the tread member to the bottom and further passing through passages extending to the sides of the shoe, and means for securing the free ends of said straps, comprising anchorage members fastened on the ends of the straps.

In testimony whereof I have affixed my signature.

GABRIEL WOLF.